Oct. 16, 1951 — E. DEL BUTTERO — 2,571,218
ELECTRICAL FURNACE
Filed Aug. 13, 1946 — 2 Sheets-Sheet 1
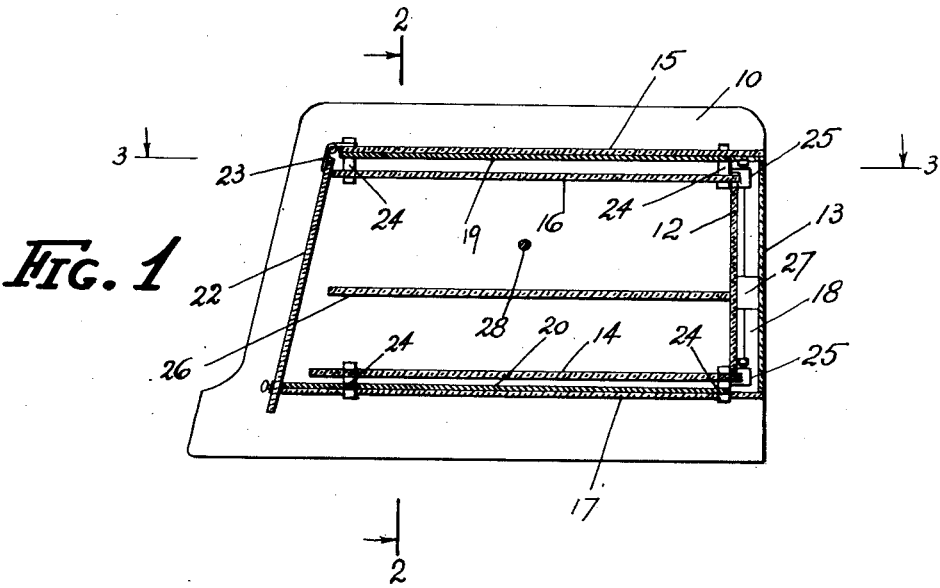
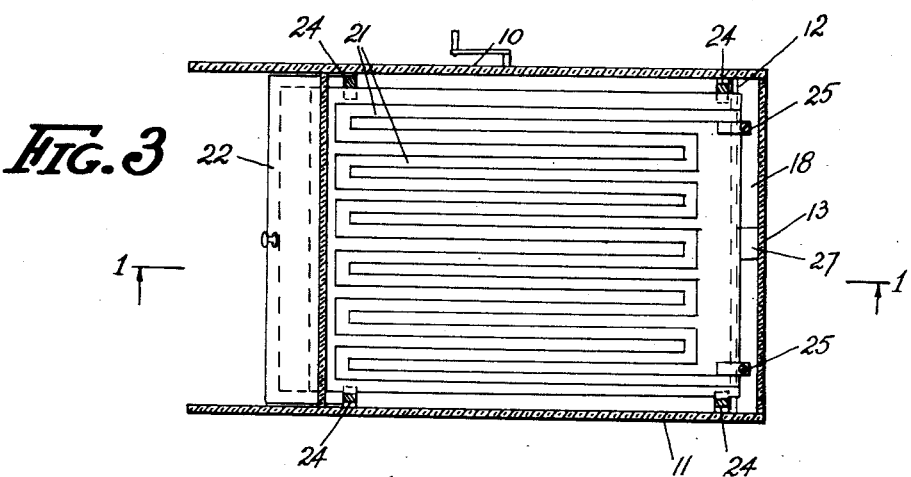
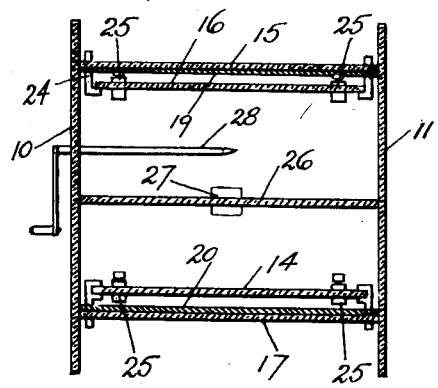
INVENTOR.
ENZO DEL BUTTERO
BY Richards + Geier
ATTORNEYS Oct. 16, 1951     E. DEL BUTTERO     2,571,218
ELECTRICAL FURNACE
Filed Aug. 13, 1946     2 Sheets-Sheet 2
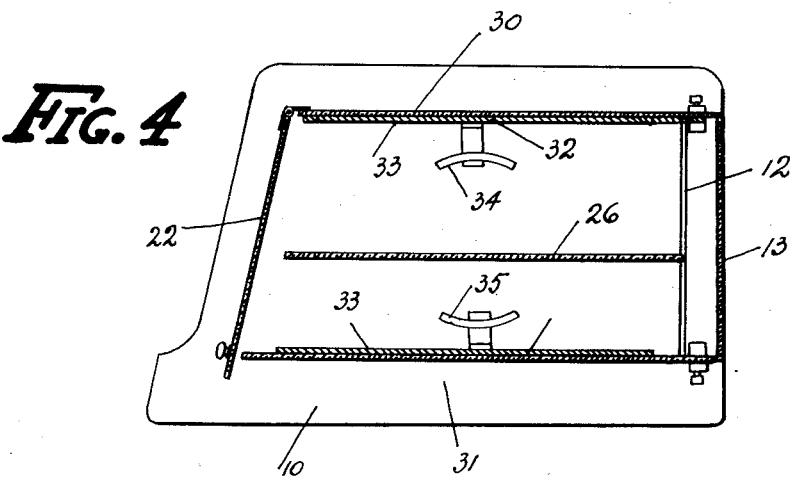
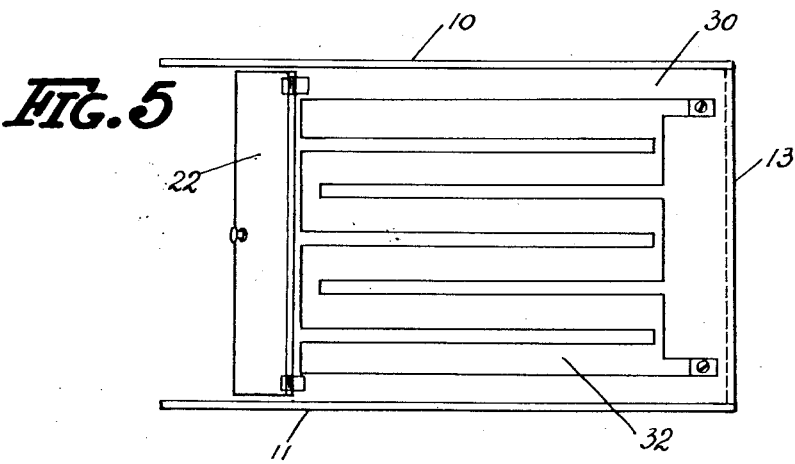
INVENTOR.
ENZO DEL BUTTERO
BY Richards + Geier
ATTORNEYS Patented Oct. 16, 1951

2,571,218

UNITED STATES PATENT OFFICE 2,571,218

ELECTRICAL FURNACE

Enzo Del Buttero, Milano, Italy, assignor to Manufactures des Glaces et Produits Chimiques de St. Gobain, Chauny & Cirey, Paris, France, a corporation of France Application August 13, 1946, Serial No. 690,107
In Italy August 13, 1945

2 Claims. (Cl. 219—35)

This invention relates to an electrical furnace or oven and refers more particularly to a furnace or oven adapted for cooking, sterilization, drying and a variety of other uses, industrial as well as household.

It is well known that kitchen ovens must be frequently opened during cooking to observe the cooking process. It is also a matter of general knowledge that the rapid drop in temperature resulting from the opening of the oven door may ruin the baking or cooking which is taking place. Even a single opening of the oven door may ruin the baking, particularly if bread, biscuits, cakes, tarts or other rising condiments are being baked. The skill of the baker is often judged by his ability to open the door of the oven only once during the entire process, namely at the precise time the baking is completed, so that the finished product can be removed. It is practically impossible to attain this skill in view of the large number of different factors which influence the baking.

An object of the present invention is to eliminate these drawbacks through the provision of an oven or furnace, the walls of which are completely transparent, being formed of plate glass capable of resisting heat and prevailing temperature variations.

Another object of the present invention is the provision of an oven for kitchen use, the interior of which is open to inspection during the entire cooking or baking, thereby eliminating errors or guesswork on the part of the user and making it possible for cooks and bakers having little experience not to rely upon guesswork but to withdraw the condiments from the interior of the oven at the precise moment of the completion of the cooking or baking operation.

It was found, however, that the transparency of the walls of the oven is insufficient in itself to attain the desired results and it is, therefore, a further object of the present invention to provide a transparent oven which will be efficient and economic in operation.

Other objects of the present invention will become apparent in the course of the following specification.

In accomplishing the objects of the present invention, it was found advisable to construct an oven, the side walls of which as well as the rear wall and the front door, are made of heat resisting plate glass. According to one of the preferred forms of the inventive idea, electro-thermic elements may consist of ordinary metallic resistances or preferably, may be formed of sheets of glass carrying a metallic layer which was deposited upon the surface of the glass and which forms a continuous band, the ends of which are attached to contacts and current-transmitting prongs. The metallic layer may be deposited in the manner described in United States Letters Patent No. 2,119,680.

In accordance with another preferred modification, the heating elements may have the form of mirrors which reflect the heat toward the interior of the oven.

According to another preferred modification, an electro-thermic heating plate is located at the bottom of the oven. Parallel to and below that plate is located a plate constituting a mirror with the reflecting surface disposed so that it reflects upwardly. The top of the oven is constructed in the same manner, so that when electrical current flows through the heating plate the upper and lower mirrors reflect the heat waves toward each other; then the heat will pass in a most efficient manner throughout the entire interior of the furnace and will be distributed therein in a most uniform manner. The special heating elements, all parts of which have the same temperature, also contribute to the uniform distribution of heat. Furthermore, the double reflections of mirrors tends to increase the uniformity of heat distribution, even though the objects to be treated within the oven may be of an extremely different nature and irregularly distributed within the oven. Other sources of heat may be introduced into the furnace or oven and the mirrors located one opposite the other will tend to distribute uniformly heat emanating therefrom, with the exception, of course, of heat propagated by conduction. This can easily be confirmed by placing a pan or dish upon the heating element. It is, therefore, advisable to arrange these additional sources of heat parallel to the mirrors.

It should be noted that the metallic band or ribbon deposited upon the glass surface in accordance with the above-mentioned Letters Patent, and constituting an electric heating resistance, is light reflecting, and that such bands are usually rather wide and long. Furthermore, it is possible to widen the band without changing its resistance, by changing other characteristics of the plating process. Therefore, in accordance with another preferred modification, the same heating element, i. e. the same glass plate which carries the resistance may serve as a mirror for reflecting the heat toward the interior of the furnace; while only a part of the glass plate will be reflectant, this reflecting part may constitute a high percentage of the total plate surface. Thus in accordance with this modification, the mirrors perform at the same time the function of the heating element; this adaptation is possible in the case of ovens for kitchen use and for many other types of ovens and furnaces.

The invention will appear more clearly from the following detailed description when taken in connection with the accompanying drawings showing, by way of example only, preferred embodiments of the inventive concept.

In the drawings:

Figure 1 is a section through an oven constructed in accordance with the principles of the present invention.

Figure 2 is a section along the line 2—2 of Figure 1.

Figure 3 is a section along the line 3—3 of Figure 1, showing a heating plate carrying a metal band.

Figure 4 is a section through a somewhat differently constructed oven.

Figure 5 is a top view of the oven shown in Figure 4.

The oven shown in Figures 1 to 3 of the drawings includes side walls 10 and 11. The side walls 10 and 11 are joined by rear walls 12 and 13 which are connected to the walls 10 and 11 by any suitable means. The inner rear wall 12 is situated at a distance from the outer rear wall 13 thus forming a space 18 which serves to prevent heat losses.

The top of the oven is formed by an upper plate 15 and another plate 16 located below the plate 15.

The bottom of the furnace consists of a lower plate 17 and another plate 14 situated above the plate 17.

The walls and plates 10 to 17 are preferably made of heat resisting glass and are transparent.

The plates 15 and 17 serve as mirrors and carry reflecting layers 19 and 20, respectively, which send the heat rays toward the interior of the furnace.

A door 22 is also made of transparent glass and is swingably mounted upon hinges or pivots 23 which are attached to the side walls 10 and 11.

The plates 15 and 17 may be firmly connected with the side walls 10 and 11 and the rear wall 13 which hold the plates 15 and 17 in place. Brackets 24 mounted in the plates 15 and 17 may be used to hold the heating plates 16 and 14. The wall 12 may be connected to the plates 16 and 14 by any suitable means.

The interior of the oven may include a shelf or support 26 which may be held by the friction between the walls 10, 11, and 12, or supported inside the oven in any other suitable manner.

The plates 16 and 14 serve as carriers of a heating resistance 21 which has the form of a strip deposited upon the plates by any suitable means.

The ends of the resistance 21 located upon the plates 16 and 14 are electrically connected to terminals 25 which may be connected in any suitable manner to a commutator or distributor 27 which changes the manner of connecting the resistances 21, for instance, by interconnecting them in series or in parallel. This may conveniently vary the amount of heat within the oven.

It is apparent that one of the most important distinctions between ovens herein described and those known in prior art, is that the oven herein described operates by means of radiating heat in a manner similar to that of the ancient open air spit prior to utilizing the convection movement of the air within the furnace for heating purposes, while all prior art furnaces utilize solely convection for heating. It is well known in the culinary art, however, that the best possible culinary results are attained through the use of such spits.

It is obvious that the same furnace, instead of being employed for cooking purposes, may be also adapted for a variety of other usages, for instance, for the sterilization of sanitary materials, surgical instruments or garments, for industrial drying purposes, dyeing and in general, in all cases wherein a heating process must be supervised in such manner that the exact end of the process must be immediately registered.

While the described examples show two heating elements placed at the top and bottom of the furnace respectively, it is obviously possible to vary this number; preferably the elements should be arranged in pairs and in such a manner as not to affect the visibility of the interior of the furnace.

As far as the output of the described furnace is concerned, it should be noted that no heat losses are transmitted through the reflecting surfaces. Heat losses through other walls of the furnace are very small, because heat produced by the heating plates is never reflected toward these walls. In order to preserve that small amount of heat which reaches the side walls of an oven by convection, at least some of these walls may be made double, as illustrated in Figure 1 by the rear walls 12 and 13.

The similarity of the action of the described oven with that of open air spit may be further enhanced by providing a rotary spit 28 in the middle of the furnace. One end of the spit 28 projects through the side wall 10. The spit can be rotated by hand whenever necessary, or it may be rotated continuously by any suitable means.

While the furnace herein described has two electrothermic elements 16 and 14, which are located at the top and bottom of the furnace, respectively, the number of these elements may be varied at will; preferably, these elements are arranged in pairs or are disposed so as not to interfere with the visibility of the interior of the furnace.

The oven shown in Figures 4 and 5 includes glass plates 30 and 31 which carry very wide strips 32 constituting heating resistances. The strips 32 cover practically the entire surfaces of the plates 30 and 31 and include heat reflecting surfaces 33 which are directed toward the interior of the oven. Additional electrothermic elements 34 and 35 may be located between the reflecting surfaces 33 to provide further heating means. It is apparent that the above example has been given solely by way of illustration and not by way of limitation and that this example may be varied within the limits of the present invention. All such variations and modifications are to be included within the scope of the present invention.

The subject matter of this application is claimed in part in the co-pending U. S. patent application, Serial No. 693,838, now abandoned.

What is claimed is:

1. An electric oven, comprising flat sheets of heat-resistant plate glass constituting the side walls, the top and the bottom of the oven, the inner surfaces of said top and bottom glass sheets having mirror surfaces formed thereon and constituting heat-reflecting layers directed toward the interior of said oven, other flat heat-resistant plate-glass sheets located within said oven and extending parallel to said reflecting layers and at a distance therefrom, and heating resistances upon said other plate glass sheets, whereby the interior of the oven is heated by radiation heat reflected by said heat-reflecting layers.

2. An electric oven, comprising flat sheets of heat-resistant plate glass constituting the side walls, the top and the bottom of the oven, a surface of one of said sheets having a mirror surface formed thereon and constituting a heat-reflecting layer directed toward the interior of said oven, said heat-reflecting layer consisting of substantially wide metallic strips constituting heating resistances and an electrothermic element located within said oven and adapted to radiate its heat upon said heat-reflecting layer.

ENZO DEL BUTTERO.

REFERENCES CITED

The following references are of record in the file of this patent:

UNITED STATES PATENTS

| Number | Name | Date |
|---|---|---|
| 1,631,655 | Sunderland et al. | June 7, 1927 |
| 1,840,698 | Chadwick et al. | Jan. 12, 1932 |
| 1,851,994 | Willis | Apr. 5, 1932 |
| 2,031,995 | Yost | Feb. 25, 1936 |
| 2,119,680 | Long | June 7, 1938 |

FOREIGN PATENTS

| Number | Country | Date |
|---|---|---|
| 13,989 | Great Britain | May 21, 1914 |
| 101,011 | Australia | May 20, 1937 |
| 263,745 | Great Britain | July 21, 1927 |